(12) United States Patent
Gruchala et al.

(10) Patent No.: US 7,809,121 B2
(45) Date of Patent: Oct. 5, 2010

(54) IDENTIFICATION OF CALLING DEVICES DIALING A UNIVERSAL NUMBER TO ACCESS A TELECOMMUNICATIONS RELAY SERVICE CENTER

(75) Inventors: Carol Shifrin Gruchala, Naperville, IL (US); Harold C. Fleischer, III, San Antonio, TX (US); Judy Mandolini, Palatine, IL (US)

(73) Assignees: AT&T Intellectual Property I, L.P., Reno, NV (US); SBC Operations, Inc., San Antonio, TX (US)

(*) Notice: Subject to any disclaimer, the term of this patent is extended or adjusted under 35 U.S.C. 154(b) by 2731 days.

(21) Appl. No.: 09/886,046

(22) Filed: Jun. 22, 2001

(65) Prior Publication Data

US 2003/0002650 A1 Jan. 2, 2003

(51) Int. Cl.
 *H04M 15/00* (2006.01)
(52) U.S. Cl. .......................... 379/114.24; 379/114.01; 379/114.21; 379/114.25; 379/245
(58) Field of Classification Search ......... 379/242–245, 379/207.15, 221.08–221.12, 114.01, 114.21, 379/114.24, 114.25
See application file for complete search history.

(56) References Cited

U.S. PATENT DOCUMENTS

| | | |
|---|---|---|
| 3,934,079 A | 1/1976 | Barnhart |
| 4,191,860 A | 3/1980 | Weber |
| 4,313,035 A | 1/1982 | Jordan et al. |
| 4,338,492 A | 7/1982 | Snopko |
| 4,349,701 A | 9/1982 | Snopko |
| 4,356,509 A | 10/1982 | Skerlos et al. |
| 4,405,946 A | 9/1983 | Knight |
| 4,456,925 A | 6/1984 | Skerlos et al. |
| 4,582,956 A | 4/1986 | Doughty |
| 4,611,094 A | 9/1986 | Asmuth et al. |
| 4,611,096 A | 9/1986 | Asmuth et al. |
| 4,756,020 A | 7/1988 | Fodale |
| 4,757,267 A | 7/1988 | Riskin |
| 4,788,718 A | 11/1988 | McNabb et al. |
| 4,802,199 A | 1/1989 | Lange et al. |
| 4,805,205 A | 2/1989 | Faye |
| 4,805,210 A | 2/1989 | Griffith, Jr. |
| 4,852,151 A | 7/1989 | Dittakavi et al. |
| 4,873,719 A | 10/1989 | Reese |
| 4,899,373 A | 2/1990 | Lee et al. |
| 4,922,523 A | 5/1990 | Hashimoto |

(Continued)

FOREIGN PATENT DOCUMENTS

BR 8603764 5/1988

(Continued)

OTHER PUBLICATIONS

FCC CC Docket No. 92-105.*

(Continued)

*Primary Examiner*—Ahmad F Matar
*Assistant Examiner*—Antim Shah
(74) *Attorney, Agent, or Firm*—Greenblum & Bernstein, P.L.C.

(57) ABSTRACT

A dialed universal telephone number is translated into a toll free telephone number corresponding to a telecommunications relay service center in a telecommunications system. When the call is connected to the telecommunications relay service center, information that identifies the caller is reliably forwarded to the telecommunications relay service center.

14 Claims, 4 Drawing Sheets

U.S. PATENT DOCUMENTS

| | | | |
|---|---|---|---|
| 4,924,496 A | 5/1990 | Figa et al. | |
| 4,974,085 A | 11/1990 | Campbell et al. | |
| 4,989,081 A | 1/1991 | Miyagawa et al. | |
| 4,995,074 A | 2/1991 | Goldman et al. | |
| 5,029,199 A | 7/1991 | Jones et al. | |
| 5,046,079 A | 9/1991 | Hashimoto | |
| 5,046,093 A | 9/1991 | Wachob | |
| 5,054,055 A | 10/1991 | Hanle et al. | |
| 5,061,992 A | 10/1991 | Ueno | |
| 5,073,927 A | 12/1991 | Grube | |
| 5,083,205 A | 1/1992 | Arai | |
| 5,099,331 A | 3/1992 | Truong | |
| 5,109,279 A | 4/1992 | Ando | |
| 5,117,452 A | 5/1992 | Callele et al. | |
| 5,138,649 A | 8/1992 | Krisbergh et al. | |
| 5,148,275 A | 9/1992 | Blatter et al. | |
| 5,163,087 A * | 11/1992 | Kaplan | 379/93.03 |
| 5,247,571 A | 9/1993 | Kay et al. | |
| 5,315,641 A | 5/1994 | Montgomery et al. | |
| 5,343,516 A | 8/1994 | Callele et al. | |
| 5,353,331 A | 10/1994 | Emery et al. | |
| 5,467,388 A | 11/1995 | Redd, Jr. et al. | |
| 5,469,500 A | 11/1995 | Satter et al. | |
| 5,491,744 A | 2/1996 | Kikinis | |
| 5,513,251 A | 4/1996 | Rochkind et al. | |
| 5,519,767 A | 5/1996 | O'Horo et al. | |
| 5,524,146 A | 6/1996 | Morrisey et al. | |
| 5,533,102 A | 7/1996 | Robinson et al. | |
| 5,546,447 A | 8/1996 | Skarbo et al. | |
| 5,559,855 A | 9/1996 | Dowens et al. | |
| 5,559,856 A | 9/1996 | Dowens et al. | |
| 5,559,857 A | 9/1996 | Dowens et al. | |
| 5,574,776 A | 11/1996 | Leuca et al. | |
| 5,581,604 A | 12/1996 | Robinson et al. | |
| 5,625,676 A | 4/1997 | Greco et al. | |
| 5,651,060 A | 7/1997 | Cohn et al. | |
| 5,680,443 A | 10/1997 | Kasday et al. | |
| 5,684,862 A | 11/1997 | Finnigan | |
| 5,696,815 A | 12/1997 | Smyk | |
| 5,724,412 A | 3/1998 | Srinivasan | |
| 5,764,748 A | 6/1998 | Rosenthal et al. | |
| 5,805,587 A | 9/1998 | Norris et al. | |
| 5,805,677 A | 9/1998 | Ferry et al. | |
| 5,805,682 A | 9/1998 | Voit et al. | |
| 5,809,112 A | 9/1998 | Ryan | |
| 5,809,128 A | 9/1998 | McMullin | |
| 5,825,862 A | 10/1998 | Voit et al. | |
| 5,835,583 A | 11/1998 | Hetz et al. | |
| 5,867,562 A | 2/1999 | Scherer | |
| 5,883,943 A | 3/1999 | Siddiqui | |
| 5,917,817 A | 6/1999 | Dunn et al. | |
| 5,917,888 A | 6/1999 | Giuntoli | |
| 5,933,490 A | 8/1999 | White et al. | |
| 5,937,050 A | 8/1999 | Yue et al. | |
| 5,946,381 A | 8/1999 | Danne et al. | |
| 5,982,774 A | 11/1999 | Foladare et al. | |
| 5,999,611 A | 12/1999 | Tatchell et al. | |
| 6,014,379 A | 1/2000 | White et al. | |
| 6,028,917 A | 2/2000 | Creamer et al. | |
| 6,031,896 A | 2/2000 | Gardell et al. | |
| 6,052,444 A | 4/2000 | Ferry et al. | |
| 6,078,581 A | 6/2000 | Shtivelman et al. | |
| 6,078,583 A | 6/2000 | Takahara et al. | |
| 6,081,589 A | 6/2000 | Jiang et al. | |
| 6,097,795 A | 8/2000 | Ungruh et al. | |
| 6,101,246 A | 8/2000 | Heinmiller et al. | |
| 6,104,800 A | 8/2000 | Benson | |
| 6,125,126 A | 9/2000 | Hallenstal | |
| 6,144,644 A | 11/2000 | Bajzath et al. | |
| 6,178,232 B1 | 1/2001 | Latter et al. | |
| 6,205,213 B1 | 3/2001 | Kucmerowski et al. | |
| 6,212,261 B1 | 4/2001 | Meubus et al. | |
| 6,219,413 B1 | 4/2001 | Burg | |
| 6,219,414 B1 | 4/2001 | Maciejewski et al. | |
| 6,259,692 B1 | 7/2001 | Shtivelman et al. | |
| 6,278,771 B1 | 8/2001 | Crockett et al. | |
| 6,317,488 B1 | 11/2001 | Depond et al. | |
| 6,366,661 B1 | 4/2002 | Devillier et al. | |
| 6,434,226 B1 | 8/2002 | Takahashi | |
| 2003/0002650 A1 | 1/2003 | Gruchala et al. | |

FOREIGN PATENT DOCUMENTS

| | | |
|---|---|---|
| CM | 2193419 | 2/1988 |
| EP | 0380315 | 8/1990 |
| EP | 0740480 | 10/1996 |
| FR | 2305078 | 10/1976 |
| FR | 2320670 | 3/1977 |
| GB | 2223911 | 4/1990 |
| JP | 1-78059 | 3/1989 |
| JP | 64-78059 | 3/1989 |
| JP | 1-91560 | 4/1989 |
| JP | 2-113657 | 4/1990 |
| JP | 2-202278 | 8/1990 |
| JP | 2-299361 | 12/1990 |
| JP | 3-29456 | 2/1991 |
| WO | 98/52324 | 11/1998 |

OTHER PUBLICATIONS

EDOCS Website, http://hraunfoss.fcc.gov/edocs_public/SilverStream/Pages/edocs.html.*

Keating, Jack et al., Telecommunications Relay Services and Speec-to-Speech Services for Individuals with Hearing and Speech Disabilities, Sep. 1998, p. 2.*

Breslin, Marie T., Re: CC Docket No. 92-105, DA 99-1170, 711 Access to telecommunications Relay Services, Aug. 2, 1999, pp. 1-2.*

Peltz-Strauss, Karen, Re: FCC Public Forum on 711 Access to Telecommunications Relay Services—Ex Parte Comments CC Dkt. No. 92-105, Aug. 2, 1999.*

Moy, Norina, re: Ex Parte Presentation CC Docket No. 92-105, Jul. 30, 1999.*

Bell Atalntic, Easier Calling for Deaf and Hard of Hearing, Jul. 1998, http://gohear.org/tech/bell.html.*

Notes from Nov. 15, 2000 7-1-1 Technical Conference. http://www.icc.state.il.us/tc/docs/001121711notes.doc.*

CC Docket No. 92-105, Sep. 8, 1999, Federal Communications Commission (FCC docket).*

Dazil Internet Services, "Caller EyeDee," printed on Dec. 13, 2001.

"Internet Call Manager—It's for You," printed on Dec. 13, 2001.

"Internet Caller ID-Call Waiting Manager (ICWM)," by Computer Peripheral Systems, Inc., printed on Dec. 10, 2001.

"Internet Call Manager", printed on Mar. 2, 1999.

English language Abstract of ep0740480.

English language Abstract of JP 3-29456.

English language Abstract of 64078059.

English language Abstract of 2223911.

English language Abstract of JP 2193419.

English language Abstract of JP 0380315.

English language Abstract of JP 2-202278.

English language Abstract of JP 6478059.

English language Abstract of 1-91560.

English language Abstract of JP 2-299361.

Bellcore Technical Reference TR-NWT-000283, Issue 2, "Simplified Message Desk Interface (SMDI) Generic Requirements," (May 1991).

Consumer Information Appliance; p. 8, Published by Jupiter Communications; Oct. 1991.

D. Wachob. "Consumer-Friendly Cable/Telco Integration: Today and Tomorrow," Communication Technology, Oct. 1991.

Class Hardware, Jupiter Communications Publication, Jan.-Feb. 1991, pp. 7-8.

Advertising Brochure for Class Mate 10, 1989.

Specification Description for MOS integrated circuit u PD 6141, dated Apr. 8, 1991.

J. Quain. "Why a Monitor Isn't a TV", PC Magazine, May 14, 1991, pp. 352-353.

Bellcore Publication TR-TSSY-000 31, "Class (sm) Feature: Calling Number Delivery", Issue 3, Jan. 1990.

Opinion of Dec. 3, 1987, *United States* v. *Western Electric Company*, (DDC. 1987), Civil Action No. 82-0192.

Modification of Final Judgment, *United States* v. *Western Electric Company* (DDC. 1992), Civil Action No. 82-0192.

Class Mate Systems Corporation Brochure, Mar. 1, 1990.

McGraw-Hill Electronics Dictionary, p. 356, (5$^{th}$ ed 1994) by John Markus & Neil Sclater.

Berman, Roger K., and Brewster, John H., "Perspective on the AIN Architecture," IEEE Communications Magazine, Feb. 1992, pp. 27-32.

"Status of PINs and Remote Access," Bell Communications Research, Technical Memorandum TM-INS-021336, May 29, 1992.

"CLASS Calling Name Delivery Generic Requirements FSD 01-02-1070," LATA Switching Systems Generic Requirements, Bell Communications Research, Technical Reference TR-NWT-001188, Issue 1 (Dec. 1991).

"Switching System Requirements for Call Control Using the Integrated Services Digital Network User Part (ISDNUP)," Bell Communications Research, Technical Reference TR-TSY-000317, Issue 2 (Jan. 1989).

"CLASS Feature: Selective Call Acceptance," Bell Communications Research, Technical Advisory TA-TSY-001034, Issue 1 (Apr. 1990).

"CLASS Feature: Distinctive Ringing / Call Waiting," Bell Communications Research, Technical Reference TR-TSY-000219, Issue 2 (Aug. 1988).

"CLASS Feature: Calling Number Delivery FSD-01-02-1051," Bell Communications Research, Technical Reference TR-TSY-000031, Issue 3 (Jan. 1990).

"ISDN Call Forwarding," Bell Communications Research, Technical Reference TR-TSY-000853, Issue 1 (Dec. 1988).

"ISDN Call Forwarding, Revision 1," Bell Communications Research, Technical Reference TR-TSY-000853, Revision 1 (Dec. 1993).

"Generic Requirements for ISDN Automatic Recall," Bell Communications Research, Technical Reference TR-NWT-001199, Issue 1 (Feb. 1992).

"CLASS Feature: Automatic Recall FSD 01-02-1260," Bell Communications Research, Technical Reference TR-NWT-000227, Issue 3 (Jun. 1993).

"CLASS Feature: Automatic Callback FSD 01-02-1250," Bell Communications Research, Technical Reference TR-NWT-000215, Issue 3 (Jun. 1993).

* cited by examiner

FIGURE 1

TRS PROVIDER CUSTOMER ASSISTANT 290

TRA with N11 Trigger

IDENTIFICATION OF CALLING DEVICES DIALING A UNIVERSAL NUMBER TO ACCESS A TELECOMMUNICATIONS RELAY SERVICE CENTER

BACKGROUND OF THE INVENTION

1. Field of the Invention

The present invention relates to telecommunications. More particularly, the present invention relates to a telecommunications network apparatus and method that provide identification information of a calling party to a telecommunications relay service center when the caller is connected to the selected telecommunications relay service by dialing a universal telephone number.

2. Background Information

The Federal Communications Commission (FCC) mandated that all telecommunications carriers implement a toll free 711 phone number for dialing access to telecommunications relay services (TRS). Each state is required to designate a telecommunications relay service center, corresponding to a toll free telephone number, to receive 711 calls originating within the state. By providing a national 711 system, the FCC hopes to accomplish faster, simpler and universal dialing from communications devices to reach a telecommunications relay service center. Specifically, the "universal" 3 digit number allows people in need of communications assistance to reach a telecommunications relay service center from anywhere in the United States by dialing the simple universal number.

Telecommunications relay services are normally provided by a telecommunications relay service center. The telecommunications relay service allows people with differing speech and/or hearing abilities to communicate with each other through a communications network using an agent or interpreter. Currently, a telecommunications relay service is typically staffed with communication assistants equipped with TTY devices and standard voice operation telephones. It is the responsibility of the telecommunications relay service provider's equipment to identify and be able to respond via voice and text to the caller.

Two methods have attempted to implement the 711 service, as described above, but each method is saddled with drawbacks. In particular, in a switch based implementation, telecommunications providers have encountered problems at the switch level translating a 711 dialing pattern into a toll free number. Furthermore, in switch types that allow translation of 711 into a toll free telephone number, telecommunications relay services have not been able to receive the identifying information that identifies a device and/or subscriber placing the call. It is desirable, however, for information such as the subscriber's name, address and telephone number, etc. to be automatically received at the telecommunications relay service center so that the information can be associated in a database with caller profiles that can be used to increase efficiency in processing calls.

The switch based method is very hardware intensive and costly, and is not a viable solution for providing the identifying information to the telecommunications relay service center. Thus, another method for providing the 711 service uses an Advanced Intelligent Network (AIN). The current Advance Intelligent Network methods, however, do not reliably forward the identifying information to the telecommunications relay service center.

That is, the present AIN system relies on a calling party number (CPN) field to be passed to the telecommunications relay service center. The calling party field is an unreliable parameter for identifying callers. For example, a caller may have requested to have her telephone number blocked from appearing, in which case the calling party number is not forwarded. Also, in some cases the calling party number is not sent, because some originating stations, such as private branch exchanges (PBXs) are not required to send calling party numbers. Moreover, the current AIN method employs a trigger that is analogous to call forwarding. Thus, some switches show 711, which caused the trigger and "forwarded" the number, as the calling party number.

A problem is known to occur in both of the current methods for implementing 711 insofar as the telecommunications relay service center is not consistently provided with the caller's identifying information. Because of the failure to identify the calling party to the telecommunications relay service center when the caller dials 711, telecommunications relay service centers have resorted to instructing callers to dial their toll free number directly. Thus, callers are required to know a different toll free number for each state, rather than a simple single national number.

To avoid the problems set forth above, a telecommunications system and method is needed for reliably forwarding identifying information about the calling device to the telecommunications relay service center.

BRIEF DESCRIPTION OF THE DRAWINGS

The present invention is further described in the detailed description that follows, by reference to the noted plurality of drawings by way of non-limiting examples of embodiments of the present invention, in which like reference numerals represent similar parts throughout several views of the drawings, and in which.

DETAILED DESCRIPTION OF THE INVENTION

In view of the foregoing, the present invention, through one or more of its various aspects, embodiments and/or specific features or sub-components, is thus intended to bring out one or more of the advantages as specifically noted below.

In one aspect of the present invention, a telecommunications method is provided that routes an originating call to an appropriate telecommunications relay service center within a local communications network interconnecting a plurality of service switching points. The originating call is made in response to a calling party inputting a universal telephone number into a communications device. The communications device is connected to a service switching point and has at least one identifier. The method includes ascertaining a toll free telephone number based on the identifier(s) in response to an input universal telephone number, the toll free telephone number corresponding to an appropriate telecommunications relay service center. The identifier(s) include at least one of an automatic number identification (ANI) and a charge number (CN). The method also includes establishing a communications connection between the first communications device and the telecommunications relay service center based upon the ascertained toll free telephone number, as well as providing the identifier(s) to the telecommunications relay service center. The identifier(s) is received at the telecommunications relay service center to identify the first communications device initiating the call.

In another aspect of the present invention, the method includes determining whether the identifier(s) has been previously received at the telecommunications relay service center and, if the at least one identifier has not been previously received, then creating a profile of a user of the first communication device and storing the profile of the user for the use of the Telecommunications relay service center. If the identifier(s) has been previously received then the telecommunications relay service center associates it with a previously created profile of the user; and updates the previously created profile of the user with information received from the calling device.

In a further aspect of the present invention, the method includes determining from the identifier(s) a state corresponding to a location of the first communication device. A toll free telephone number corresponding to the telecommunications relay service center for the state corresponding to the location of the first communications device can be found after the state is determined in this embodiment.

In still another aspect of the present invention, the telecommunication relay service centers are equipped with memory and graphical displays or user interfaces that display identifying information. The method can include counting the number of times each calling number has called the telecommunications relay service center.

In another aspect of the present invention, the identifying information includes the location of the calling party, and the phone number associated with the first communications device.

In a further aspect of the present invention, information that is graphically displayed and stored in memory is used to offer special services, for planning and billing purposes.

According to a further aspect of the present invention, a telecommunications system is provided that routes an originating call to a telecommunications relay service center. The originating call is placed by dialing a universal telephone number using a communications device. The telecommunications system includes at least one service switching point connected to a plurality of communications devices which are each associated with an identifier. The identifier is either a charge number or an automatic number identification. A service control point that communicates with at least one service switching point translates the dialed universal telephone number into a toll free telephone number corresponding to a telecommunications relay service center. The service control point also receives the identifier(s) from service switching points. The service switching point(s) connects the dialing communications device to the telecommunications relay service center using the toll free telephone number, and the service switching point(s) also forwards the identifier to the telecommunications relay service center.

In a further aspect of the present invention the service control point(s) determines an originating state from the identifier(s) and determines a toll free telephone number corresponding to the telecommunications relay service center for the originating state.

In another aspect of the present invention, at least one feature group D trunk connects at least one service switching point to the telecommunications relay service center. The feature group D trunk(s) can include a multi frequency feature group D trunk, and the identifier can be an automatic number identification (ANI). In another aspect of the present invention, the feature group D trunk operates with a Signaling System 7 network and the identifier is the charge number.

According to still another aspect of the present invention a computer readable medium is provided that stores a computer program that determines a telephone number for a telecommunications relay service center based upon a calling party's location. The computer readable medium receives data at a service control point from a service switching point corresponding to a calling party's location, where the data includes at least one of a charge number and an automatic number identification. The computer readable medium also determines an originating location for the calling party based on the received data, and determines a toll free telephone number for the telecommunications relay service center corresponding to the originating location of the calling party.

A telecommunications system is provided for routing telephone calls to telecommunications relay service centers and consistently providing information that identifies the calling party to the telecommunications relay service centers. The telecommunications system includes an advanced intelligent network (AIN) in which service logic is provided at service control points (SCPs) that receive queries from service switching points (SSP) receiving calls.

The service switching point is connected to an individual communications device, such as a phone or fax, and responds to particular dialing patterns or sequences. The service switching point triggers when it receives a predetermined dialing pattern and sends a query to the service control point. In response, the service control point processes the trigger and transfers control to common service logic, which determines a routing solution for the call. The routing solution is forwarded to the service switching point by the service control point, and the service switching point arranges for the call to be connected to the appropriate telecommunications relay service center. More specifically, when the service switching point receives digits dialed by an end user, e.g., 711, the 711 call is suspended at the service switching point, a query is launched and the service control point translates 711 into a toll free telephone number. The call is then forwarded and connected to a telecommunications relay service center.

As described below, the common service logic of the service control point can determine the originating location (e.g., state) of a call based on the calling party number, the NPANXX, the charge number, the automatic number identification, or any other identifier that explicitly or implicitly indicates the originating location of the call. Additionally, service control points are provided with means, such as a database or table, for determining a toll free number corresponding to telecommunications relay service for each originating location.

In one embodiment, the routing solution involves finding the toll free number corresponding to the telecommunications relay service center selected to serve the calling device's home state. The routing solution is forwarded to the service switching point by the service control point, and the service switching point connects the calling party to the appropriate telecommunications relay service center using the toll free number corresponding to the telecommunications relay service center selected to serve the calling device's home state. In other words, the 711 call is translated into a toll free telephone call by the procedure and equipment described above, and the call to the telecommunications relay service center is completed.

In the present invention, the call to the telecommunications relay service center provides the center with information that identifies the calling party device by using equipment that reliably passes the information through the system. For example, feature group D (FG D) trunk groups will pass charge number if the trunk group is SS7 or automatic number identification (ANI) if the trunk group is multifrequency.

Figure 1:
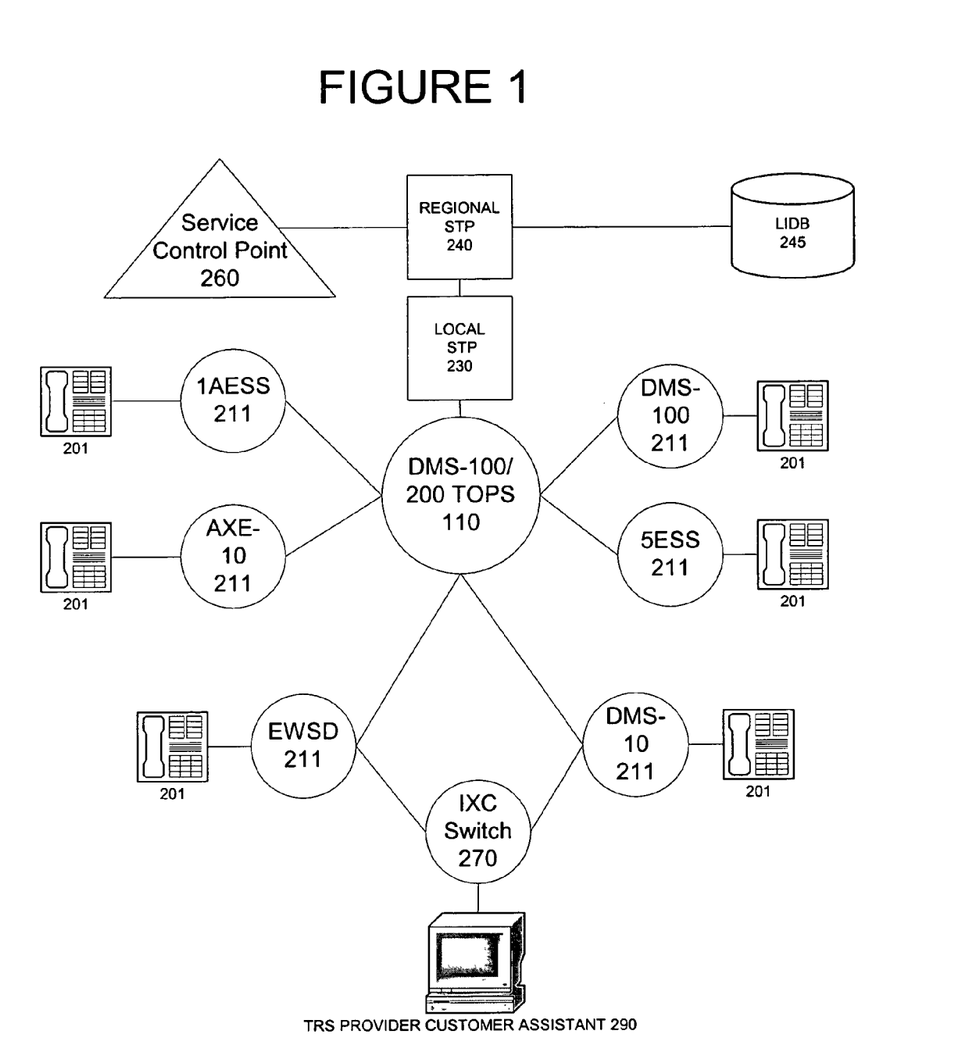
FIG. 1 shows an exemplary telecommunications network architecture for the telecommunications relay service, according to an aspect of the present invention.

FIG. 1 shows an exemplary service architecture of the telecommunications system of the present invention. As shown, end users using a communication device 201, go off hook and dial a universal telephone number, such as 711, to reach a telecommunications relay service center. Each communications device is connected to a respective service switching point 211. Exemplary service switching points 211 include: the Ericsson AXE-10 switch with Release AS308.18; the Nortel DMS-10 with Release 410.10; the Nortel DMS-100 with Release NA011; the Siemens EWSD with Release 16; the Lucent Technologies 5ESS with Release 5E13; and the Lucent Technologies 1AESS with Release 1A13.03.

According to the present invention, each service switching point 211 is set with an originating trigger that responds to the universal telephone number. Exemplary triggers include the N11 trigger, which is used with the Ericsson AXE-10, the Nortel DMS-10, the Nortel DMS-100, the Siemens EWSD, and the Lucent Technologies 5ESS; and the 3D trigger, used with the Lucent Technologies 1AESS service switching point. In response to the trigger, the service switching point suspends the call and launches a query to the service control point 260 through signaling transfer points, e.g., the local signaling transfer point 230 and the regional signaling transfer point 240.

Exemplary service control points 260 include the Telecordia Integrated Service Control Point Current Generation Platform (ISCP) (CGP) with Release version 5.0.9.13; the ISCP Next Generation Platform (NGP) with Release version 6.4.2.1; and the Lucent Service Control Point (LSCP) with Release 94 and Service Package Application Version 6 (SPA V6) or later. The interface between the service switching points 211 and the service control point 260 may be the Telecordia AIN GR-1299, entitled "Switch-Service Control Point (SCP)/Adjunct Interface."

In response to the query, the service control point 260 executes its internal 711 service logic and signals back to the inquiring service switching point 211 with the toll free telephone number corresponding to the appropriate telecommunications relay service center. The service switching points 211 then access a toll free database 245 to obtain a routing telephone number or carrier identification code of the interexchange carrier that serves the toll free number. An exemplary toll free database 245 is a line identification database (LIDB) version R7.5.

The call is then routed from the service switching point 211 through an interexchange carrier switch 270 corresponding to the telecommunications relay service center to a telecommunications relay service center customer assistant 290. Information associated with the call identifies the calling party 201. In other words, the call is continuously routed from the calling device 201 to the telecommunications relay service center customer assistant 290, and the "translation" of the universal telephone number takes place within a signaling network while the call is suspended. Thus, the translation does not affect the identifying information associated with the calling party so that the telecommunications network forwards the identifying information to the telecommunications relay service center.

The present invention uses network protocols. For example, the present invention may use the AIN Release 0.2 (AIN R0.2) messages defined for Signaling System 7's (SS7's) transaction capabilities application part (TCAP) messages. The present invention may also use information carried in Signaling System 7's integrated services digital network (ISDN)'s user part (ISUP) messages.

Figure 2:
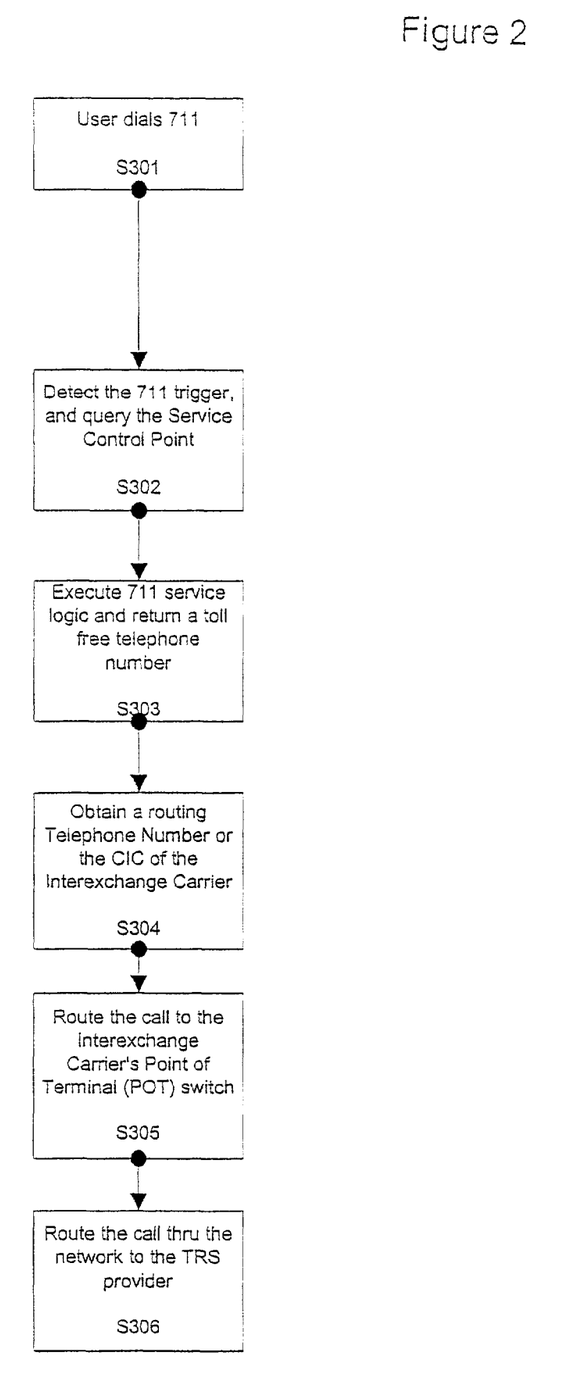
FIG. 2 is a flow diagram showing a method for completing a 711 call, according to an aspect of the present invention.

A summary of the overall logic of the present invention is now described with reference to FIG. 2. Initially, a user connected to a service switching point dials 711 in S301 by, for example, removing a phone handset from a cradle and entering 711 on a keypad. The service switching point connected to the user's device detects the 711 call and launches a query to the service control point in S302. The service control point executes the 711 service logic and returns a toll free telephone number in the response in S303. The service logic is described in greater detail below, but generally includes ascertaining the state where the calling device is located and then finding the toll free telephone number corresponding to the telecommunications relay service center of that state.

The service switching point determines the routing information for the appropriate telecommunications relay center in S304. Subsequently, the service switching point accesses the toll free data base to obtain a routing telephone number or the carrier identification code of the interexchange carrier for the toll free number. The processing of S304 occurs because toll free numbers, unlike local or regional telephone numbers, can exist in any area code. Thus, the routing telephone number or the carrier identification code can be used to facilitate routing to the telecommunications relay service center corresponding to the toll free number. The call is then routed in S305 to the point of terminal switch of the interexchange carrier corresponding to the toll free number. The interexchange carrier corresponding to the toll free number routes the call through its network to the telecommunications relay service center in S306. Significantly, identification of the calling device is automatically provided to the telecommunications relay service center.

In another embodiment end users dial 0 for the operator instead of dialing 711. The service switching point then routes the call to a traffic operating positioning system (TOPS). The operator located at the traffic operating positioning system receives the operator call from the calling party and, upon request, dials 711 for the end user. In effect, the traffic operating positioning system functions as a service switching point and detects the 711 trigger. The service switching point queries the service control point for instructions and the service control point executes the 711 service logic.

Figure 3:
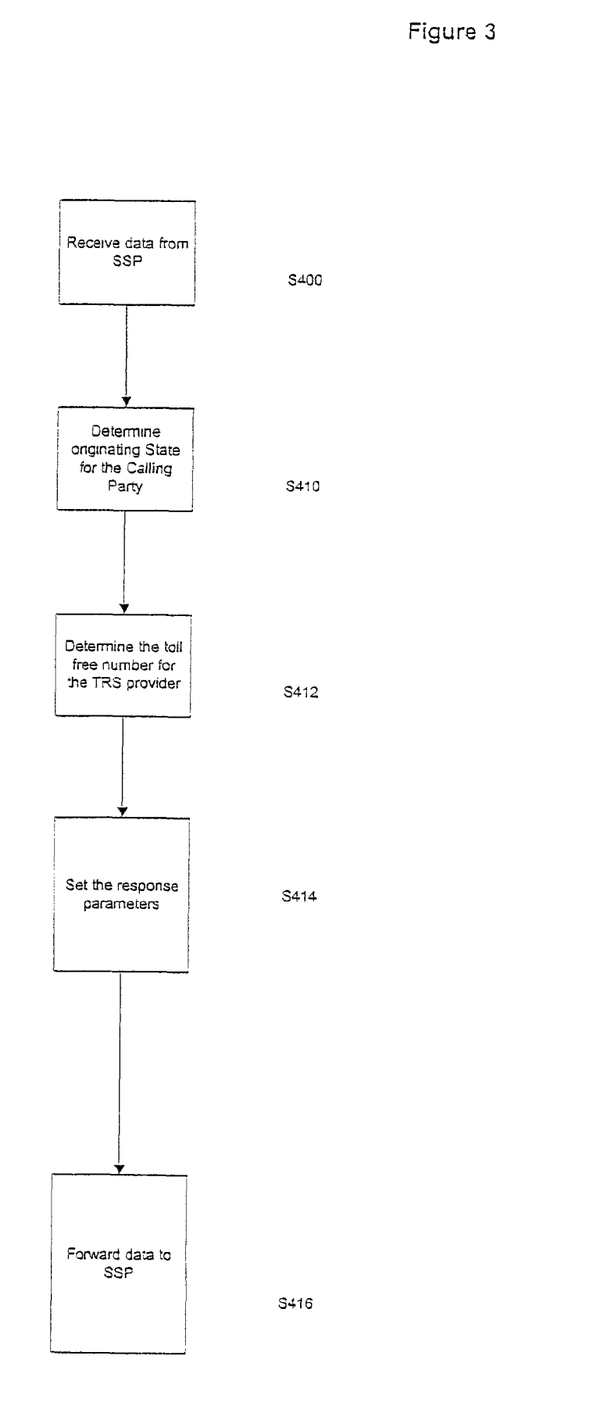
FIG. 3 is a flow diagram showing exemplary service logic, according to an aspect of the present invention.

FIG. 3 shows an exemplary service logic, according to an aspect of the present invention. In S400, the service control point receives data from the triggering service switching point. In S410 the state of origin for the calling party is determined. In one embodiment, the state is determined by using an NPANXX table. More specifically, an identifier associated with the calling party, e.g., the charge number, the ANI, etc. is used to perform a lookup in the NPANXX table.

An exemplary layout of the NPANXX table is shown below as Table 1. The table includes an NPANXX column, a Local Access and Transport Area (LATA) column and a STATE column. The NPANXX column stores either an NPA or an NPANXX. The LATA column stores a 3 digit LATA, and the STATE column stores the 2 character postal abbreviation for a state or the District of Columbia. Such a table should include all NPANXXs in the service area, so that all lookups will find a match. As a result of a lookup in the table, the state corresponding to the NPANXX of the calling party telephone number is retrieved.

The table may be populated as follows: for each NPA, the dominant LATA and STATE combination will be entered. All NPANXX rows of the dominant NPA with the same LATA and STATE will be deleted. The NPANXX rows with other than the dominant LATA and STATE will be retained. By way of illustration, an example of how the NPANXX information is edited for the NPANXX table is presented for a list of 605 NPANXX rows, 599 of which are NPANXX rows with LATA 521 and STATE MO. Six rows have LATA 522 and STATE MO. The results of editing the NPANXX entries are shown in the exemplary NPANXX Table.

TABLE 1

| NPANXX | LATA | STATE |
|---|---|---|
| 314 | 521 | MO |
| 314225 | 522 | MO |
| 314227 | 522 | MO |
| 314342 | 522 | MO |
| 314343 | 522 | MO |
| 314879 | 522 | MO |
| 314920 | 522 | MO |

As can be seen, the 599 NPANXX rows with LATA 521 and STATE MO are condensed to the top entry for the NPA. Each entry with a LATA and/or STATE different from the predominant entry has its own NPANXX row in the table.

According to one embodiment of the present invention, the lookup occurs as follows the identifier of the calling telephone number includes an NPANXX, which is used to search the table. If the NPANXX of the telephone number is not found in the table, then the logic will conduct a second and final search using only the NPA of the telephone number. By definition, all NPANXXs are covered by the NPANXX table, such that the search that is executed in the service control point logic will find a match with either an NPANXX row, or the dominant NPA row. As a result of the above process, the state corresponding to the NPANXX of the calling party telephone number is retrieved.

Once the state is determined at S410, the appropriate toll free number is determined at S412. In one embodiment, the toll free number is found by performing a lookup in a Master Telecommunications Relay Center Table. In one embodiment, the table supports up to 51 rows corresponding to 50 states and the District of Columbia, and at least two columns: STATE, and TOLL FREE NUMBER. The STATE column stores the two character postal abbreviation for each state or the District of Columbia. The TOLL FREE TELEPHONE NUMBER column stores the toll free number, such as a 1-800 number, corresponding to the telecommunications relay service center for the state. Thus, the state abbreviation retrieved from the NPANXX table is used to locate the appropriate toll free number. After the toll free telephone number has been determined, at S416 it is forwarded to the service switching point.

It is noted that the present invention handles a cross boundary situation. Cross boundary refers to situations where a service switching point serves customers in multiple states. Because the present invention routes the calls to a telecommunications relay service center based upon the location of the calling device, the present invention determines the telecommunications relay service center based upon the state indicated by the NPANXX, and not by use of the location of the service switching point. Thus, the cross boundary effect is addressed by the present invention.

Figure 4:
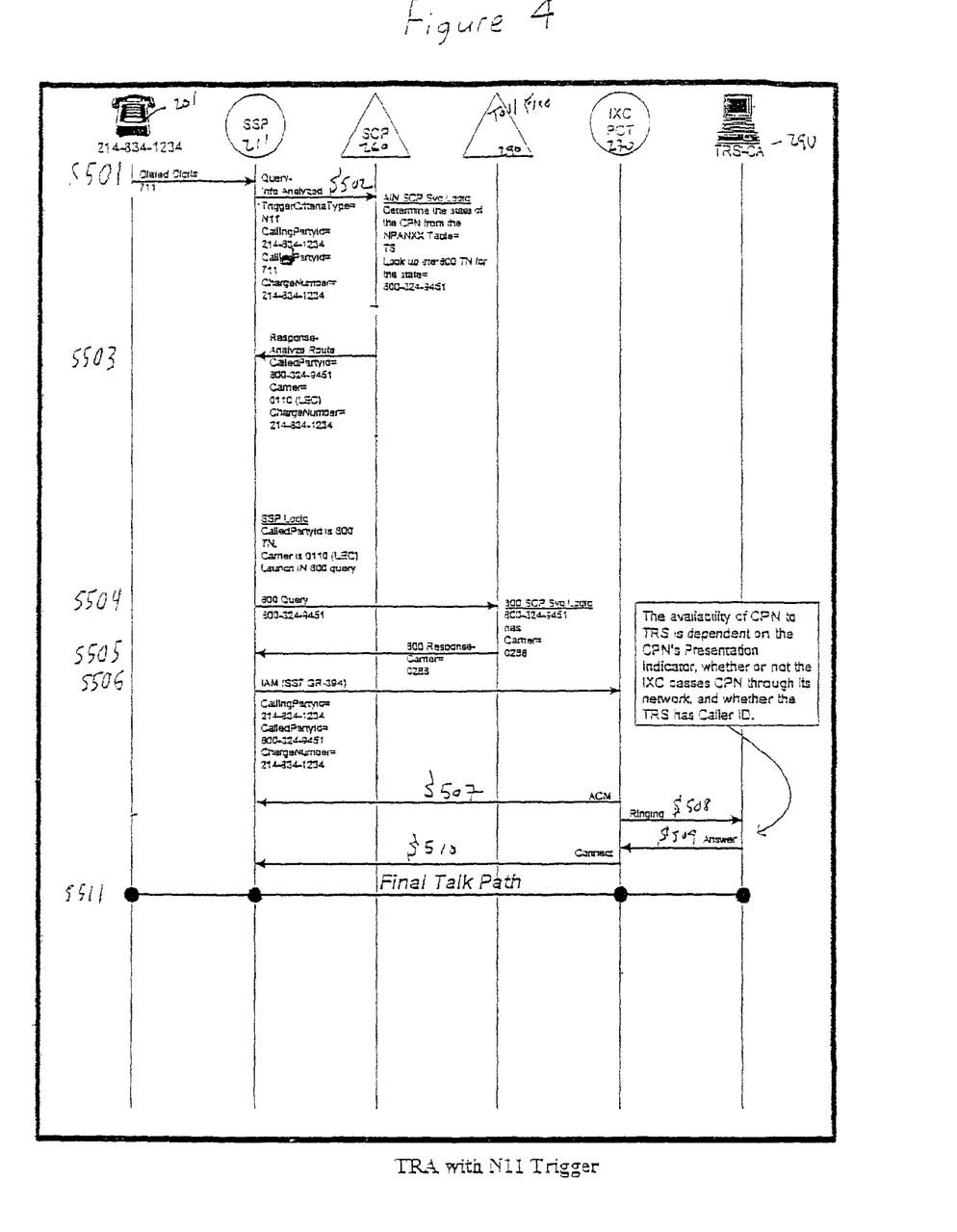
FIG. 4 is an exemplary call flow diagram showing the various steps for completing a call to a telecommunications relay service center, according to an aspect of the present invention.

FIG. 4 shows an exemplary call flow diagram that illustrates parameters in the queries between the various components of the system of the present invention. Parameters that may be in the query that are not used in the service logic of the present invention are not always shown. That is, no attempt has been made to show all provisioned data. Rather enough details have been provided to understand the interdependencies of the network elements.

As noted above, the call starts when a user, corresponding to a telephone number of 214-834-1234, dials 711 from their device. Dialing 711 results in a connection to the service switching point in S501, where the digits 711 are analyzed. Subsequently, a query is forwarded to the service control point in response to the dialed digits, 711. In this example, the trigger is an N11 trigger, the calling party ID is 214-834-1234, the called party ID is 711, and the charge number is 214-834-1234.

In S502, the service control point service logic determines the state of the calling party number from the NPANXX table, and looks up the corresponding toll free number for the telecommunications relay service center corresponding to the state. In this example, the toll free number is 800 324-9451. In S503 the service control point returns the toll free number to the service switching point in the called party ID parameter. The local exchange carrier CIC (e.g., 0110) is returned in the carrier parameter and the original charge number, i.e, 214 834-1234, is returned in the charge number parameter.

By setting the carrier parameter to correspond to the local exchange carrier, the response that includes the toll free number forces the service switching point to query the toll free database. Consequently, at S504 the service switching point queries the toll free database to obtain the CIC of the interexchange carrier serving the toll free telephone number. The toll free database receives the toll free number from the service switching point and determines the appropriate interexchange carrier. Subsequently, in S504, the toll free database returns the CIC of the carrier corresponding to the toll free number, in this example, 0288.

Finally, the call is set up via the interexchange carriers point of termination. More specifically, at S506 an initial address message is sent to the interexchange carrier's point of termination, wherein the service switching point identifies itself over the SS7 GR-394 trunk with a calling party ID set to the original calling party ID (e.g., 214 834-1234), a called party ID set to the toll free telephone number of the telecommunications relay service center, and a charge number equal to the original charge number of the calling party device. In S507, the address complete message to the service switching point, indicates that the entire address has been received and that it is time to forward the call. S508, S509 and S510 are ringing, answering and connecting respectively. At S511 the final talk path is established.

By receiving ANI, CN or CPN, the telecommunications relay service center of the present invention can match caller information with profiles of repeat callers (e.g., persons calling from the same phone number repeatedly over time). The telecommunications relay service center can then almost instantly tailor the service for a caller using the existing profile. Some actions might be taken with the call before the agent assigned to the call even answers. For example, the profile may include a name, address, phone number, disability, caller history indicating reasons a caller has used the service before, or an indication of whether the caller communicates in a language other than English. In some cases, the profile may be used to route the call to the most appropriate available agent at the telecommunications relay service center. In a situation where a hearing or speech impaired person dials 711 rather than 911 in an emergency, such profile information would be useful in saving time processing the call and arranging for help to be sent to the caller.

To consistently provide identifying information, the present invention uses equipment including trunks that cannot block the information presented to the telecommunications relay service center. More particularly, the present invention provides charge number (CN) to carriers using feature group D (FG D) trunk groups if the trunk group is SS7. Alternatively, the present invention provides ANI if the trunk group is multifrequency.

In one embodiment, one or more actions might be taken with the call before the agent assigned to the call even answers. For example, the profile may include a name, address, phone number, disability, caller history indicating reasons a caller has used the service before, or indication if the caller communicates in a language other than English. In another embodiment, the profile may be used to route the call to a most appropriate available agent at the telecommunications relay service center.

According to the improvements described above for various embodiments of the present invention, a telecommunications relay service center will receive the identification of the caller similar to caller information available to 911 services nationwide. Such information can then be compiled and evaluated to tailor future services for the caller.

The invention disclosed herein allows great flexibility in the types of configurations a telecommunications relay service center can have, while still receiving the identification information of the calling device. For example, the present invention supports a single telephone number to access a group of communications assistants that support any combination of Text-To-Speech (TTS), Speech-To-Text (STT), and Speech-To-Speech (STS). If the telecommunications relay service center is configured to support only one of TTS, STT and STS, then another toll free number will be required for callers to directly access other communications assistants that support one or both of the other two types of service. Similarly, the telecommunications relay service center can also support three toll free numbers, one for each type of service to be supported. In this last case with three separate toll free numbers, the universal phone number can be translated into one of the toll free numbers designated for one particular group of communications assistants.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

For example, the telecommunications relay service centers could be provided with web screen access to enable them to determine where calls are originating from and the number of calls that would be originating from each 711 caller. In this embodiment, the 711 service includes a peg counter associated with each calling number for a given period of time (e.g., 24 hours or 7 days). Telecommunications relay service center administrators can access this data via a web screen and then can utilize the information for planning, billing or offering special services to select callers. The administrators can also determine the casual users (i.e., calls from hotels, airports, or pay phones).

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission public telephone networks represent examples of the state of the art. Such standards are periodically superseded by faster or more efficient equivalents having essentially the same functions. Accordingly, replacement standards and protocols having the same functions are considered equivalents.

What is claimed is:

1. A method for routing a call to a telecommunications relay service center, the call being initiated in response to a calling party inputting a universal telephone number into a communications device, the method comprising:
    establishing a communications connection between the communications device and the telecommunications relay service center over a signaling system 7 (SS7) feature group D trunk line; and
    forwarding a charge number (CN) to the telecommunications relay service center over the signaling system 7 feature group D trunk line.

2. The method of claim 1, further comprising:
    ascertaining a toll free telephone number in response to the input universal telephone number, the toll free telephone number corresponding to the telecommunications relay service center.

3. The method of claim 1, further comprising:
    determining whether the charge number has been previously received at the telecommunications relay service center;
    when the charge number has not been previously received:
        creating a profile of a user of the communication device; and
        storing the profile of the user for the use of the telecommunications relay service center;
    when the charge number has been previously received:
    associating the charge number with a previously created profile of the user; and
    updating the previously created profile of the user with information received from the calling device.

4. The method of claim 1, further comprising:
    determining, from the charge number, a state corresponding to a location of the communication device.

5. The method of claim 4, further comprising:
finding a toll free telephone number corresponding to the telecommunications relay service center for the state corresponding to the location of the communications device.

6. The telecommunications method of claim 1, wherein the telecommunication relay service center is equipped with memory and graphical displays that display identifying information.

7. The telecommunications method of claim 6, further comprising counting the number of times a calling number has called the telecommunications relay service center.

8. The telecommunications method of claim 6, wherein the identifying information comprises the location of the calling party and a phone number associated with the communications device.

9. The telecommunications method of claim 3, wherein the profile is used for planning and billing purposes.

10. A telecommunications system that routes a call to a telecommunications relay service center, the call being initiated in response to a calling party inputting a universal telephone number into a communications device, the telecommunications system comprising:
a service switching point that establishes a communications connection between the communications device and the telecommunications relay service center over a signaling system 7 (SS7) feature group D trunk line, the service switching point forwarding a charge number (CN) to the telecommunications relay service center over the signaling system 7 feature group D trunk line; and
a service control point that communicates with the service switching point, the service control point translating the universal telephone number into a telephone number corresponding to the telecommunications relay service center.

11. The telecommunications system of claim 10, wherein the service control point determines an originating state from the charge number, and determines a telephone number corresponding to the telecommunications relay service center for the originating state.

12. The telecommunications system of claim 10, wherein the charge number enables the telecommunications relay service center to identify the communications device.

13. A computer readable medium storing a computer program that routes a call to a telecommunications relay service center, the call being initiated in response to a calling party inputting a universal telephone number into a communications device, the computer readable medium comprising:
a communications connection establishing code segment that establishes a communications connection between the calling party and the telecommunications relay service center over a signaling system 7 (SS7) feature group D trunk line; and
an identification information forwarding code segment that forwards a charge number (CN) of the calling party to the telecommunications relay service center over the signaling system 7 feature group D trunk line.

14. The computer readable medium of claim 13, further comprising:
a telephone number determining code segment that determines a toll free telephone number in response to the input universal telephone number, the toll free telephone number corresponding to the telecommunications relay service center.

* * * * *